Patented Sept. 1, 1942

2,294,426

UNITED STATES PATENT OFFICE 2,294,426

PIGMENT MANUFACTURE

Sylvester A. Scully, New Milford, N. J., assignor to Interchemical Corporation, New York, N. Y., a corporation of Ohio No Drawing. Substituted for abandoned application Serial No. 314,047, January 16, 1940. This application August 8, 1941, Serial No. 406,007

2 Claims. (Cl. 260—148)

This invention relates to the pigment prepared by coupling tetrazotized dianisidine with Schaeffer's salt (2 naphthol-6 sulfonic acid) and preparing a metal complex therefrom, and has particular reference to a method of preparing the pigment in high concentration aqueous slurry.

This pigment (and others of similar nature) is extremely hydrophile and organophobe. When it is dried, it cannot be dispersed in hydrophobic organic media; and it cannot be flushed from an aqueous pulp into a hydrophobe organic system. It has been proposed to disperse this pigment in such a system by malaxating a filter press cake with an organic colloid on an open mill such as a rubber compounding roll. The method is successful, but expensive, due to the fact that filter press cakes of this pigment generally contain about 5–10% of pigment, necessitating the evaporation of from 9 to 19 parts of water for each part of pigment.

I have discovered a method of producing this pigment in such form that press cakes of 20–30% pigment content can be readily prepared. This method comprises coupling tetrazotized dianisidine with Schaeffer's salt in an acid medium, followed by conversion of the pulp to the alkaline state to develop its color, following which the pigment is laked with a copper or other salt.

A typical example of the method is the following:

6.1 pounds of dianisidine are slurried in 18 gallons of water and 14.3 pounds of 20° Baumé hydrochloric acid is added. The mass is stirred until hydrochloride formation is complete, and then the whole is iced to 0–5° C. A solution of 3.75 pounds of sodium nitrite dissolved in 4–5 gallons of water is then added slowly, thus tetrazotizing to a strong positive reaction to starch-KI paper. When tetrazotization is complete, 15 pounds of sodium acetate dissolved in water is added and stirred in well. The resulting solution should show no reaction to Congo red paper. This is then diluted to 60 gallons. This solution is added over a period of 20–25 minutes to a solution of 12.3 pounds Schaeffer's salt (beta naphthol-6-sulfonic acid) in a total of 90 gallons of water at 0–5° C. There is formed a dull maroon pigment of fairly large particle size. This suspension is stirred for at least one-half hour. There is then added 12.5 pounds of 28% ammonium hydroxide to distinct alkalinity, whereupon there is formed a blue pigment, the particle size and other characteristics of which, even after treating with a copper sulfate solution (17.5 pounds as a solution) lend to easier and more rapid filtration and washing. The pigment concentration in a filter press cake thus prepared approximates 20–30%.

I believe that the increased solid content of the press cake is due to the fact that the pigment is first separated as the maroon pigment, which is probably only partally coupled, and that the blue pigment formed on the addition of the ammonium hydroxide takes the form of the original precipitate, instead of the form it would take if prepared directly, in conventional fashion.

The method may be varied considerably, the important point being to cause the original coupling to take place in a buffered acid solution, at a pH above about 4.0 and below 7.0, and to produce the final blue pigment by a change in the already precipitated maroon color.

The blue finally produced may be coppered, or may be metallized with many other metal salts, including those of the alkali metals, the alkali earth metals, nickel, cobalt, zinc, copper, manganese, iron, aluminum, and chromium.

Various modifications can of course be made in my invention without departing from its scope, which is defined in the claims.

This application is a substitute for abandoned application Serial No. 314,047, filed January 16, 1940.

I claim:

1. The method of producing a high solids aqueous pulp of the pigment obtained by coupling tetrazo dianisidine with 2 naphthol 6 sulfonic acid, which comprises initially coupling the components in a bath maintained at a pH of from about 4.0 to about 7.0, whereby a maroon pigment is formed, thereafter adding an alkali to the bath whereby the pigment is converted to a blue color, and thereafter metallizing the pigment.

2. The method of producing a high solids aqueous pulp of the pigment obtained by coupling tetrazo dianisidine with 2 naphthol 6 sulfonic acid, which comprises initially coupling the compounds in a bath maintained at a pH of from about 4.0 to about 7.0, whereby a maroon pigment is formed, thereafter adding an alkali to the bath whereby the pigment is converted to a blue color, and thereafter metallizing the pigment with a copper salt.

SYLVESTER A. SCULLY.

CERTIFICATE OF CORRECTION.

Patent No. 2,294,426. September 1, 1942.

SYLVESTER A. SCULLY.

It is hereby certified that error appears in the printed specification of the above numbered patent requiring correction as follows: Page 1, second column, line 9, for "partally" read --partially--; line 47, for "compounds" read --components--; and that the said Letters Patent should be read with this correction therein that the same may conform to the record of the case in the Patent Office.

Signed and sealed this 13th day of October, A. D. 1942.

(Seal)

Henry Van Arsdale,
Acting Commissioner of Patents.